US010564984B2

(12) United States Patent
Honghalli Devaraju

(10) Patent No.: US 10,564,984 B2
(45) Date of Patent: Feb. 18, 2020

(54) EARLY LOGO DISPLAY IN A MULTIPROCESSOR ARCHITECTURE

(71) Applicant: Continental Automotive GmbH, Hannover (DE)

(72) Inventor: Anil Kumar Honghalli Devaraju, Singapore (SG)

(73) Assignee: Continental Automotive GmbH, Hannover (DE)

( * ) Notice: Subject to any disclaimer, the term of this patent is extended or adjusted under 35 U.S.C. 154(b) by 262 days.

(21) Appl. No.: 15/281,518

(22) Filed: Sep. 30, 2016

(65) Prior Publication Data

US 2017/0031693 A1     Feb. 2, 2017

Related U.S. Application Data

(63) Continuation-in-part of application No. PCT/IB2014/060375, filed on Apr. 2, 2014.

(51) Int. Cl.
| | | |
|---|---|---|
| *G06F 9/451* | (2018.01) | |
| *G06F 9/44* | (2018.01) | |
| *G06F 9/4401* | (2018.01) | |
| *G06F 13/42* | (2006.01) | |

(Continued)

(52) U.S. Cl.
CPC .......... *G06F 9/4406* (2013.01); *G06F 9/4401* (2013.01); *G06F 9/4403* (2013.01); *G06F 9/4411* (2013.01); *G06F 9/451* (2018.02); *G06F 13/4282* (2013.01); *G06T 1/20* (2013.01);

(Continued)

(58) Field of Classification Search
CPC ................................ G06F 9/4406; G06F 1/20
See application file for complete search history.

(56) References Cited

U.S. PATENT DOCUMENTS

| | | | |
|---|---|---|---|
| 7,472,001 B2 | 12/2008 | Grace et al. | |
| 8,989,954 B1 * | 3/2015 | Addepalli | H04W 4/046 701/32.3 |
| 2005/0231529 A1 | 10/2005 | Skwarek et al. | |

(Continued)

FOREIGN PATENT DOCUMENTS

| | | |
|---|---|---|
| CN | 201268289 Y | 7/2009 |
| CN | 103092720 A | 5/2013 |

(Continued)

OTHER PUBLICATIONS

International Search Report and Written Opinion dated Dec. 26, 2014 from corresponding International Patent Application No. PCT/IB2014/060375.

(Continued)

*Primary Examiner* — Phil K Nguyen

(57) ABSTRACT

An infotainment assembly for a vehicle has a vehicle communication controller and a multimedia controller with an interchip communication bus and a serial bus connection, a message processing unit and a remote messaging interface having a one-way protocol. The multimedia controller comprises a display connection for a display device, a message receiver, and a computer readable memory with an operating system having multiple boot phases, wherein graphics drivers of the operating system for controlling the display device are loaded in a later boot phase of the operating system. A graphics driver retrieves an image or a video input and transmits a raw image during an earlier boot phase of the operating system.

9 Claims, 7 Drawing Sheets

Figure 1:
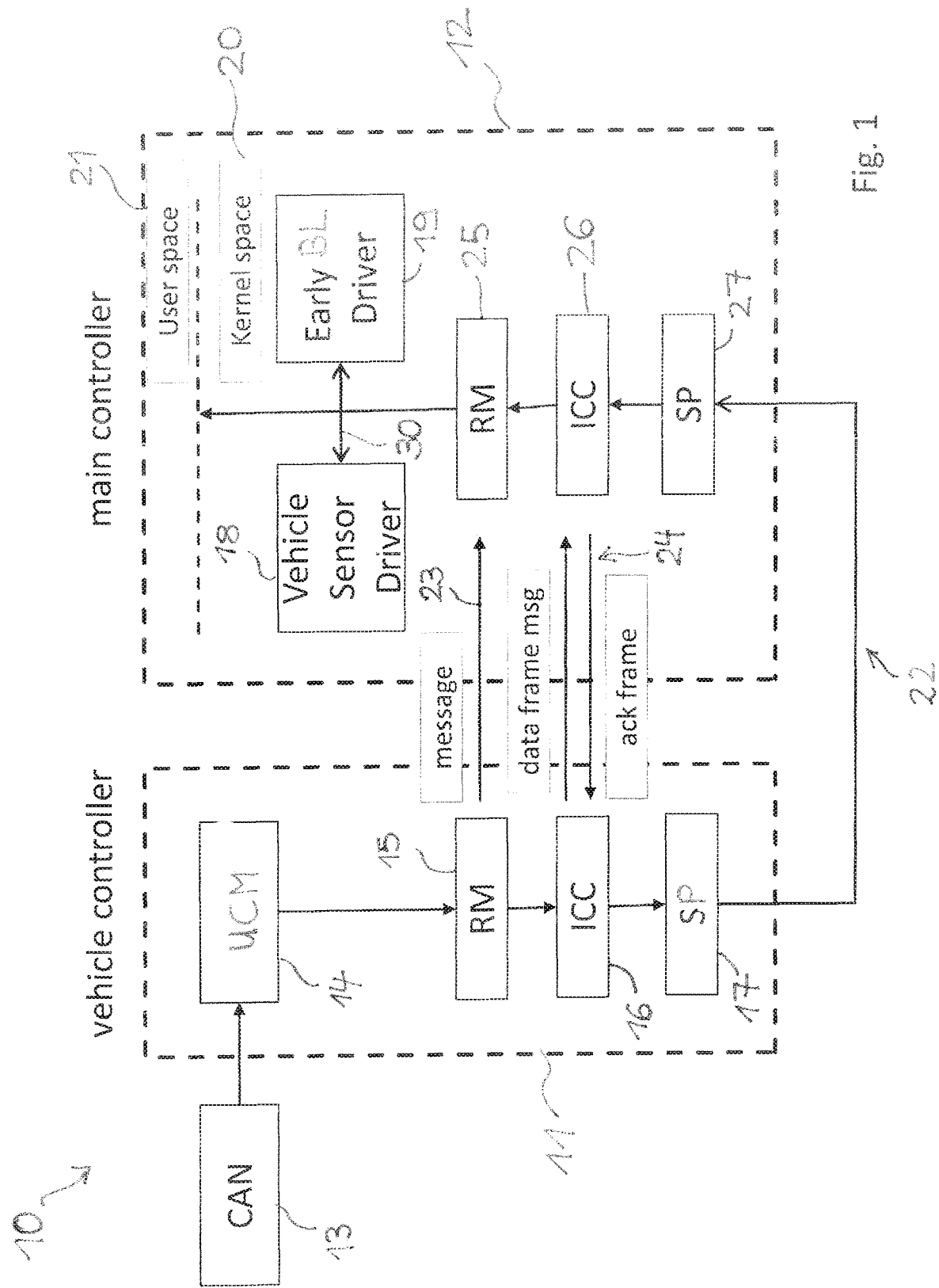

(51) Int. Cl.
*G06T 1/20* (2006.01)
*H04L 12/40* (2006.01)

(52) U.S. Cl.
CPC .................... *G06T 2200/28* (2013.01); *H04L 2012/40215* (2013.01); *H04L 2012/40273* (2013.01)

(56) References Cited

U.S. PATENT DOCUMENTS

| | | | |
|---|---|---|---|
| 2008/0309472 A1 | 12/2008 | Kostepen | |
| 2009/0075624 A1 | 3/2009 | Cox et al. | |
| 2013/0054945 A1 | 2/2013 | Free et al. | |
| 2013/0345898 A1 | 12/2013 | Park et al. | |
| 2014/0082342 A1* | 3/2014 | Pinto | G06F 9/4406 713/2 |
| 2014/0223158 A1* | 8/2014 | Zhou | G06F 9/4405 713/2 |
| 2014/0232870 A1* | 8/2014 | Mondal | H04N 7/01 348/148 |
| 2014/0368653 A1* | 12/2014 | Wang | G06F 13/24 348/148 |
| 2015/0040113 A1* | 2/2015 | Muench-Casanova | G06F 9/4406 717/168 |
| 2015/0353012 A1* | 12/2015 | Hwang | B60R 1/00 348/118 |

FOREIGN PATENT DOCUMENTS

| | | |
|---|---|---|
| CN | 103552561 A | 2/2014 |
| EP | 1465370 A1 | 10/2004 |
| WO | 2005122129 A1 | 12/2005 |

OTHER PUBLICATIONS

Ramesh Natarajan, "6 Stages of Linux Boot Process (Startup Sequence)", Feb. 7, 2011, pp. 1-23, XP055514017, retrieved from the internet: URL:https://www.thegeekstuff.com/2011/02/1 inux-boot-process/, retrieved on Oct. 10, 2018, p. 1-4.
Search Report dated Feb. 13, 2018 from corresponding European Patent Application No. 14888428.1.

* cited by examiner

EARLY LOGO DISPLAY IN A MULTIPROCESSOR ARCHITECTURE

This application relates to a car infotainment system.

In order to enhance driver and/or passenger experience, passenger vehicles may be provided with hardware or software products and systems which are built into, or can be added to the vehicle. A vehicle system that unites car radio and entertainment, navigation system, hands-free equipment, driver assistance and other functionality is also referred to as "infotainment system". In the past, infotainment systems had been offered mainly for luxury and medium-class vehicles but recently they are becoming more common in lower-class vehicles as well.

Different from a car-computer having display functions in the driver's display, which indicate the car's health state and other related information, an infotainment system often comprises a large display device in the central console of the car. Thereby, a co-driver is able to operate it as well.

A car infotainment system typically comprises a head unit with mainboards having a CPU and SDRAM components. Furthermore, digital signal processors (DSPs) or a field programmable gate array (FPGA) are often used for audio processing, mp3 image decoding and graphics processing. The speedometer and further car components are connected to a controller area network (CAN) bus. Further audio components, such as the CD changer or the amplifier, are connected via a media oriented systems transport (MOST) bus. Other bus systems that may be connected to the infotainment system include the local interconnect network (LIN) bus and the Flexray bus.

The majority of the infotainments system on the market is designed using more than one controller for using a real time operating system to implement hard real time functionalities and features such as a human machine interface, media and phone, which requires a system on chip with a high end microprocessor and operating system.

It is an object of the present specification to provide an improved display in a car infotainment system.

The present specification discloses an infotainment assembly for a vehicle with a vehicle communication controller (VUC). The infotainment assembly may be packaged and sold together in a compact unit, the unit having an input connection for a power supply and for a CAN bus and output connections for peripheral devices such as a display device.

The vehicle communication controller refers to a controller for managing, among others, power management and CAN communication.

The vehicle communication controller comprises a bus connection, especially a bus connection for connecting a serial bus, especially a CAN bus of the vehicle and in particular a low speed CAN bus. Furthermore, the vehicle communication controller comprises a message processing unit, which is also referred to as rear view camera trigger business logic or "RVC trigger BL", and a remote messaging interface, also referred to as message dispatcher, for sending out messages using a one-way protocol. The one-way protocol is implemented on top of an interchip communication protocol such as the CAN bus.

The infotainment system includes a multimedia controller (MMU) that is connected to the vehicle communication controller via an interchip communication bus. The multimedia controller refers to a controller for managing media play back, the human machine interface and further functions.

Furthermore, the multimedia controller comprises a display connection for connecting a display device of the vehicle. By way of example, the display connection may be provided by a CVBS/S-video output which uses a low voltage differential signaling (LVDS).

Furthermore, the multimedia controller comprises a message receiver for receiving messages from the vehicle communication controller according to the one-way protocol. By way of example, the message receiver may be configured to periodically read out a dedicated memory location to which messages from the vehicle communication controller are written. The message receiver may be realized in software, hardware or a combination thereof.

Moreover, the multimedia controller comprises a computer readable memory with an operating system, such as a Windows embedded or a Linux embedded operating system. The memory may be provided as part of the multimedia controller or as a memory which a part of the infotainment assembly but external to the multimedia controller. In the latter case, the operating system is loaded or copied into a memory of the multimedia controller during start-up of the multimedia controller.

The operating system provides multiple boot phases for the multimedia controller. In a later boot phase of the operating system, one or more graphics drivers of the operating system for controlling the display device are loaded into a computer readable memory. In particular, the driver may be provided as a Windows shared library or DLL which can be loaded via the operating system functions "LoadLibary" or "LoadDriver".

In the context of a Windows OS, drivers can be categorized into native drivers and stream drivers. Native drivers typically support input and output peripherals, such as display drivers, keyboard drivers, and touch screen drivers. The Graphics, Windowing, and Events Subsystem (GWES) loads and manages these drivers directly. Native drivers are usually provided by an original equipment manufacturer and implement specific functions according to their purpose, which the GWES can determine by calling the GetProcAddress API. Stream drivers, on the other hand, expose a well-known set of functions that resemble file system operations and that enable the Device Manager to load and manage these drivers.

Furthermore, the multimedia controller comprises a message handler unit which provides such functions as a backlight thread and a touchscreen driver, for activating a back light of the display device. The message handler activates the back light in response to a power state message received from the message receiver, if the power state message indicates a powered on state of the vehicle electronics. The activation of the back light applies in particular to a display screen which is provided by an LCD display. The message handler unit may be implemented by software, by hardware or a combination thereof. In particular, the message handler unit can be provided by an efficient kernel mode driver, which is loaded into a kernel space of the operating system. Under the Windows CE OS, the Drivers loaded by the Graphics, Windows and event (GWES) and the FileSys subsystem are kernel mode drivers.

By contrast, a user mode driver is loaded into the memory of a specialized user process, such as the "Udevice.exe". Under Windows CE, the user space has limitations compared to the kernel space in that
  the kernel structure and the kernel memory are not accessible,
  a large part of the kernel API is not available, the use of the available part of the kernel API is restricted by registry settings, access to user buffers is limited. Which servers are to be loaded into kernel or user space is determined by markers such as registry settings or file entries. So called universal drivers have the ability to be loaded in both the kernel space and the user space. Preferentially, a video driver according to the current specification is a universal driver.

The message handler unit is operative during an earlier boot phase of the operating system, which precedes the later boot phase. In one embodiment, only the file system drivers of the operating system and the further drivers of the operating system are loaded in the earlier boot phase and the further drivers of the operating system are loaded in the later boot phase. Herein, "drivers of the operating system" also includes those drivers that are provided by the original equipment manufacturers (OEM).

According to a further embodiment, the vehicle communication controller comprises a message dispatcher unit which is operative to send messages according to the one-way protocol. The messages sent by the message dispatcher unit may comprise CAN bus messages which are filtered for relevance and reformatted according to the one-way protocol, or messages which are generated as a result of the evaluation of CAN bus messages.

In particular, the one-way protocol may be implemented on top of an interchip communication protocol for the communication between the vehicle communication controller and the multimedia controller. For example, messages of the one-way protocol can be packaged into messages of the interchip communication protocol. More specifically, the one-way protocol may be realized as a communication bus of the vehicle electronics, such as a low speed CAN, a high speed CAN or a LIN bus.

According to a second aspect, the current specification discloses an infotainment assembly for a vehicle. The infotainment assembly comprises the previously mentioned components such as a vehicle communication controller and a multimedia controller. The explanations provided above also apply to the similar components of the second infotainment assembly.

The vehicle communication controller comprises, a CAN connection for connecting a CAN bus of the vehicle, a message processing unit and a remote messaging interface or message dispatcher for sending out messages using a one-way protocol.

The multimedia controller is connected to the vehicle communication controller via an interchip communication bus. The multimedia controller comprises a display connection for connecting a display device of the vehicle, a message receiver for receiving messages according to the one-way protocol, and a computer readable memory with an operating system. The operating system provides multiple boot phases for the multimedia controller. The graphics drivers of the operating system for controlling the display device are loaded in a later boot phase of the operating system.

The infotainment assembly according to the second aspect comprises a graphics driver. In addition the infotainment according to the second aspect may also comprise the abovementioned message handler unit for ensuring that the graphics driver is called after the back light of a display screen that has a back light is turned on.

The graphics driver is operative for retrieving an image from a computer readable memory, such a flash memory, in particular a NOR flash memory, or from a video input of the multimedia controller. Furthermore, the graphics driver is operative for decoding the image into a raw image and for transmitting the raw image to a display device buffer of the car infotainment system via the display device connection. Thereby the image to is caused be displayed. The graphics driver is operative during an earlier boot phase of the operating system, the earlier boot phase preceding the later boot phase.

In particular, the graphics driver can be provided by an efficient kernel mode driver, which is loaded into a kernel space of the operating system. For faster loading and/or efficient use of storage space the stored image may be provided as a compressed image, for example by using an easy to decode run length compression.

The multimedia controller may have a multiprocessor architetecture such as the loading of the operating system and the graphics driver can be performed on dedicated processor. The operating system can choose processor based on information provided by the graphics driver or based on external configuration data such as a file entry or a registry entry or by the file location in which the graphics driver is stored.

According to a further embodiment, the multimedia controller comprises a flash memory with one or more compressed splash screen images, and the graphics driver comprises an instruction set for deriving a raw image from the compressed image, for example by decoding a run length encoded image.

In a further embodiment, the infotainment assembly comprises a display device with a display buffer, wherein the graphics driver causes the raw image to be copied into the display buffer. Thereby, the raw image is displayed on a display screen of the display device.

In yet a further embodiment, the infotainment assembly comprises a work buffer and a display buffer. The graphics driver being is operative to copy the raw image into the work buffer. Then, the raw image is displayed by flipping the contents of the work buffer and the display buffer.

According to a further embodiment, the graphics driver is operative to receive a signal indicating that a back light of the display device is turned on and to retrieve the image in response to the signal indicating that the back light of the display is turned on. In particular, the signal may be generated by a message handler unit, which is provided in the way explained above.

Furthermore, the present specification discloses a car infotainment system with the infotainment assembly. The car infotainment system comprises a display device with a display screen, the display device being connected to a video output of the infotainment assembly.

Moreover, the present specification discloses a car with the car infotainment system. A vehicle electronics bus, such as low speed CAN, a high speed CAN or a LIN bus is connected to an input of the car infotainment assembly.

In a further aspect, the present specification discloses a method for activating a display of a car infotainment system. A power state of the car electronics, such as a power state of a bootstrap power supply, is detected. Furthermore, information about the power state from a vehicle communication controller is transmitted to a multimedia controller using a one-way communication protocol which is implemented on an interchip communication protocol, such as a CAN bus protocol or another type of ICC protocol.

The power state signal is received and a back light command signal is sent to the display to turn on a back light of the display on if the power state indicates a powered on state. The steps of the method are executed during an earlier boot phase of an operating system that provides multiple boot phases. The earlier boot phase precedes a later boot phase in which graphics drivers of the operating system for accessing the display device are loaded.

Furthermore, the present specification discloses a method for displaying a screen image on a display of a car infotainment system. An image to be displayed is received from a computer readable memory, such as a flash memory. The image may be compressed, for example by run length compression or other compression algorithms.

A raw image is derived from the stored image and the raw image is loaded into a display buffer of the car infotainment system. The content of the display buffer is displayed on a display screen of the display device. The steps of the method are executed during an earlier boot phase of an operating system providing multiple boot phases. The earlier boot phase precedes a later boot phase in which graphics drivers of the operating system for accessing the display screen are loaded.

Figure 2:
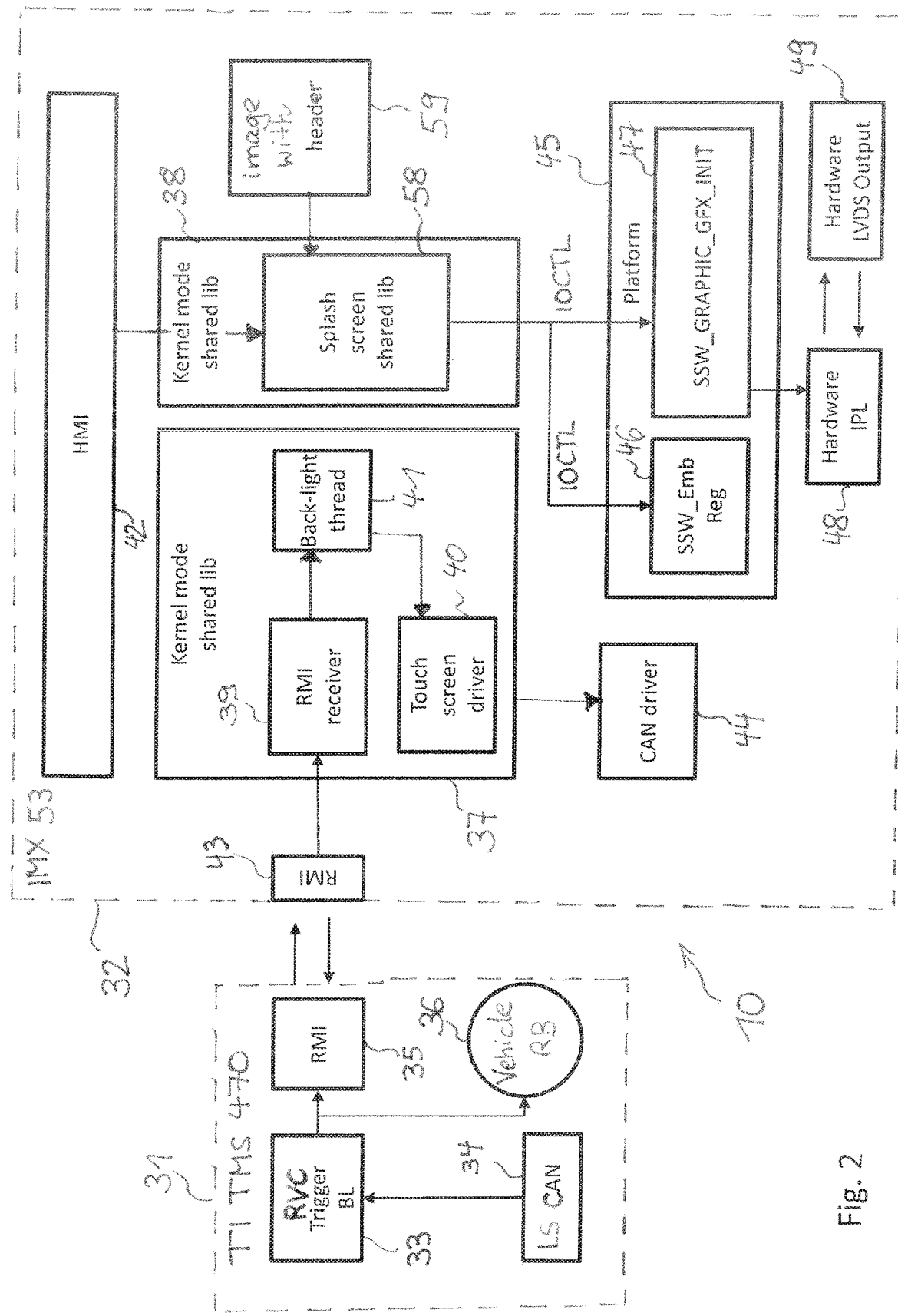
Figure 3:
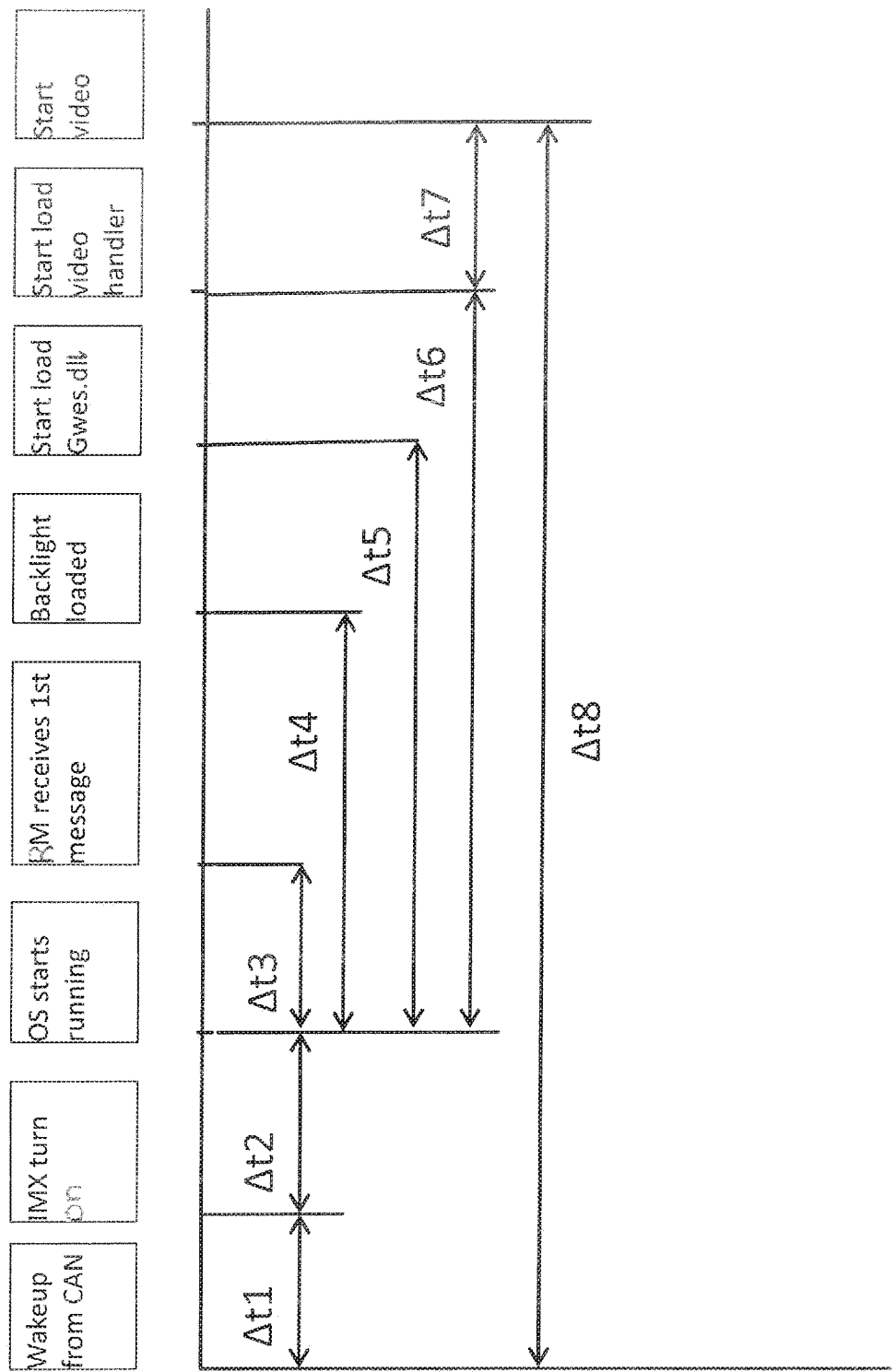
Figure 4:
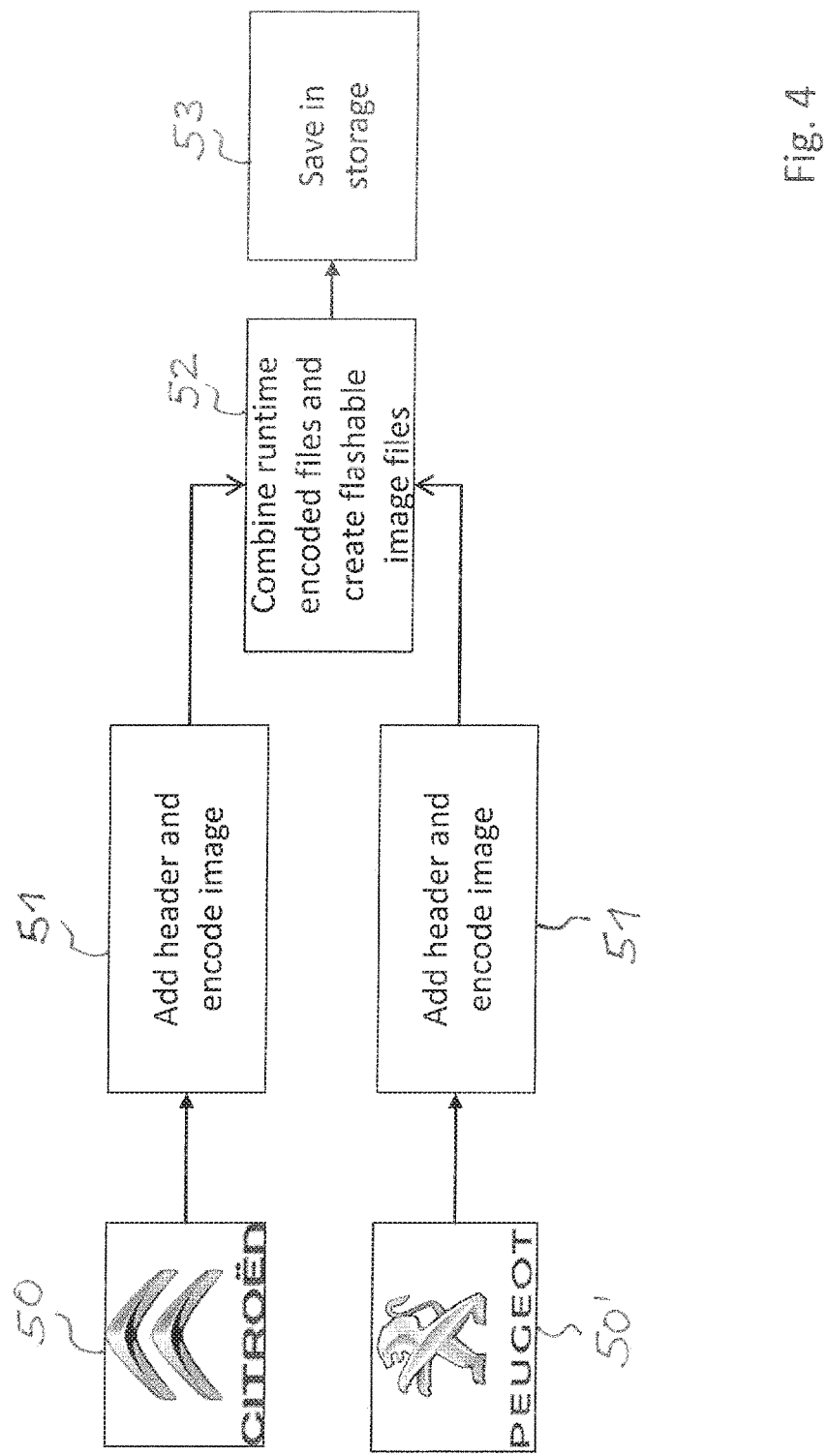
Figure 5:
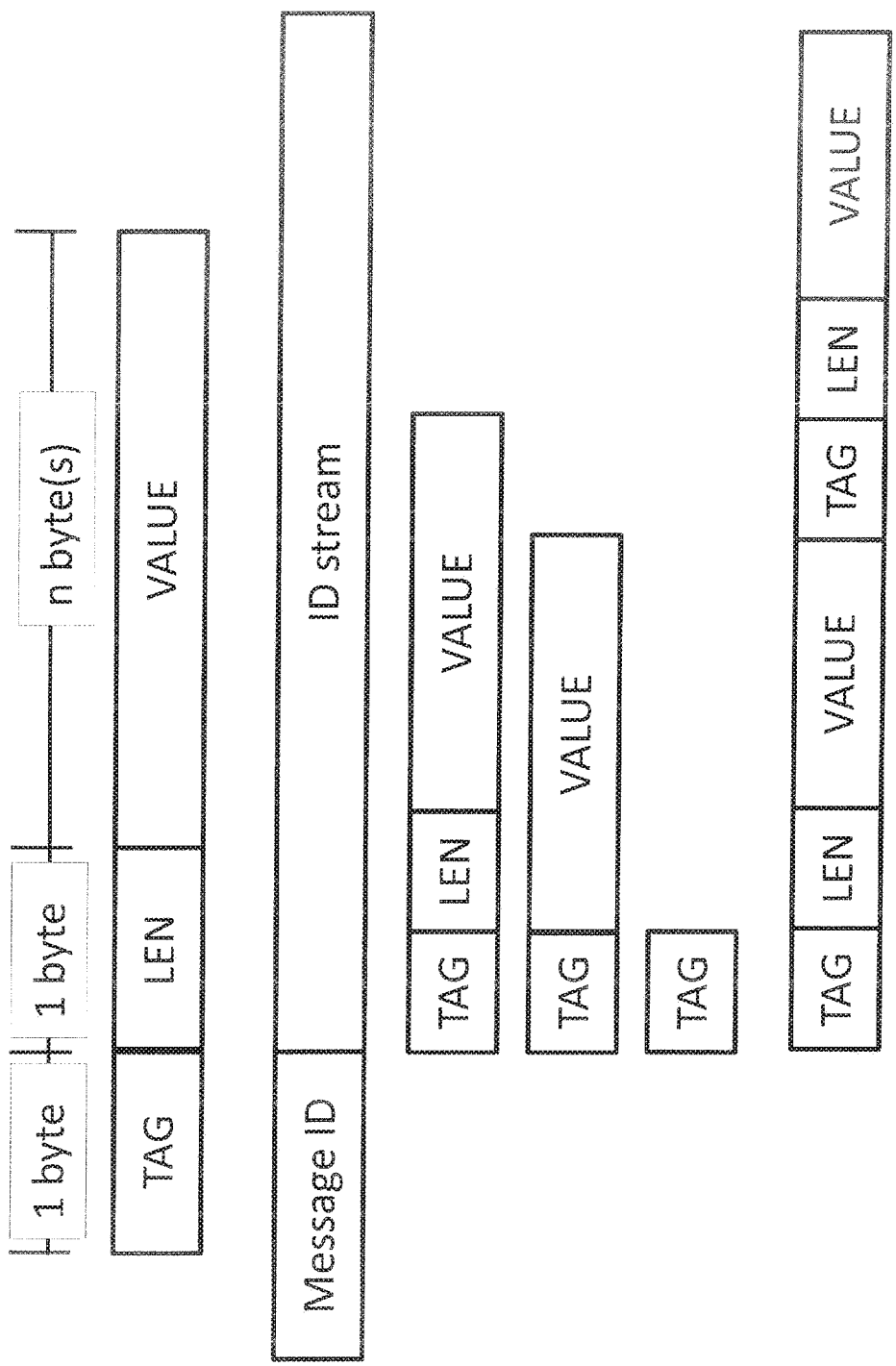
Figure 6:
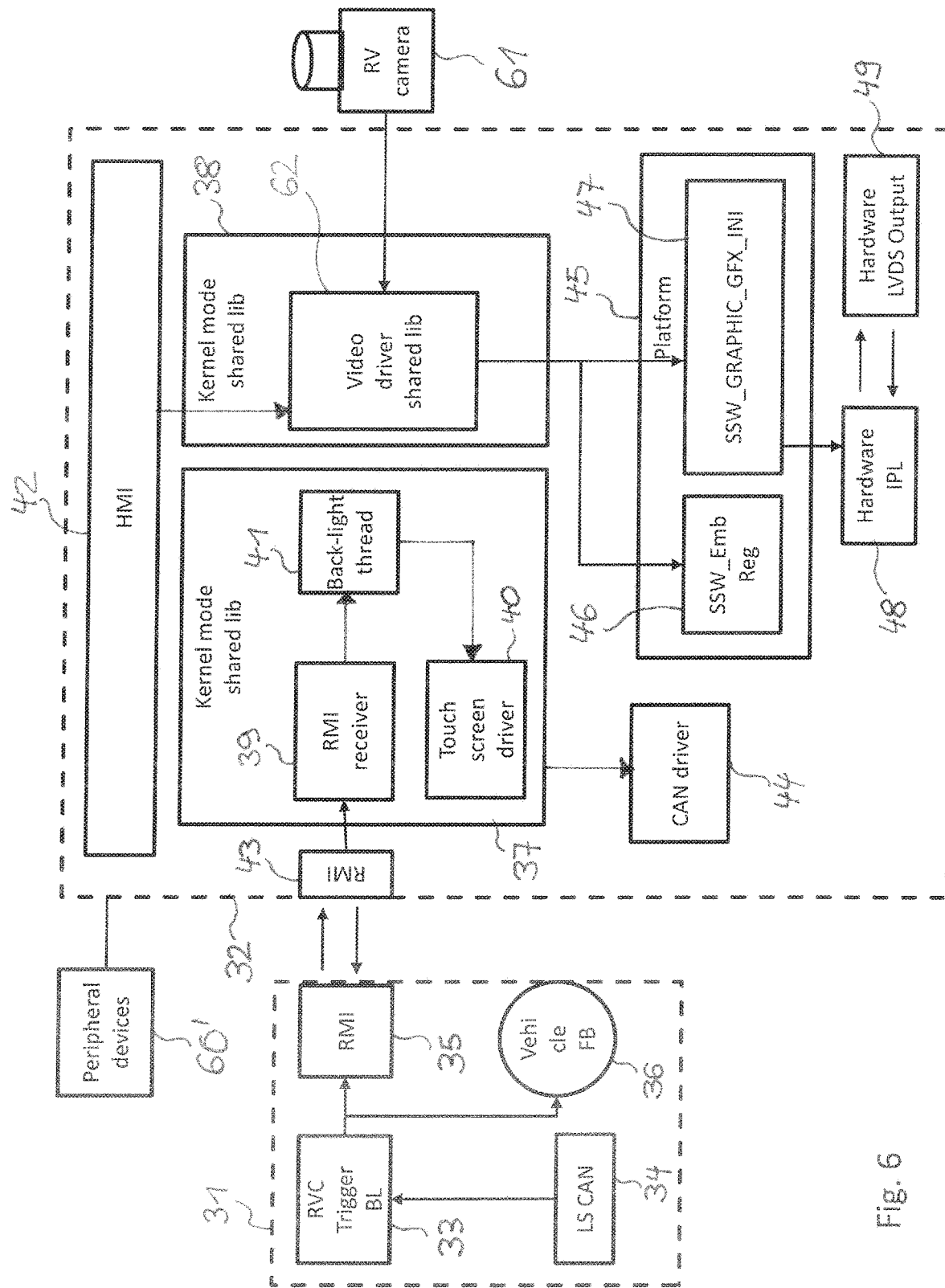
Figure 7:
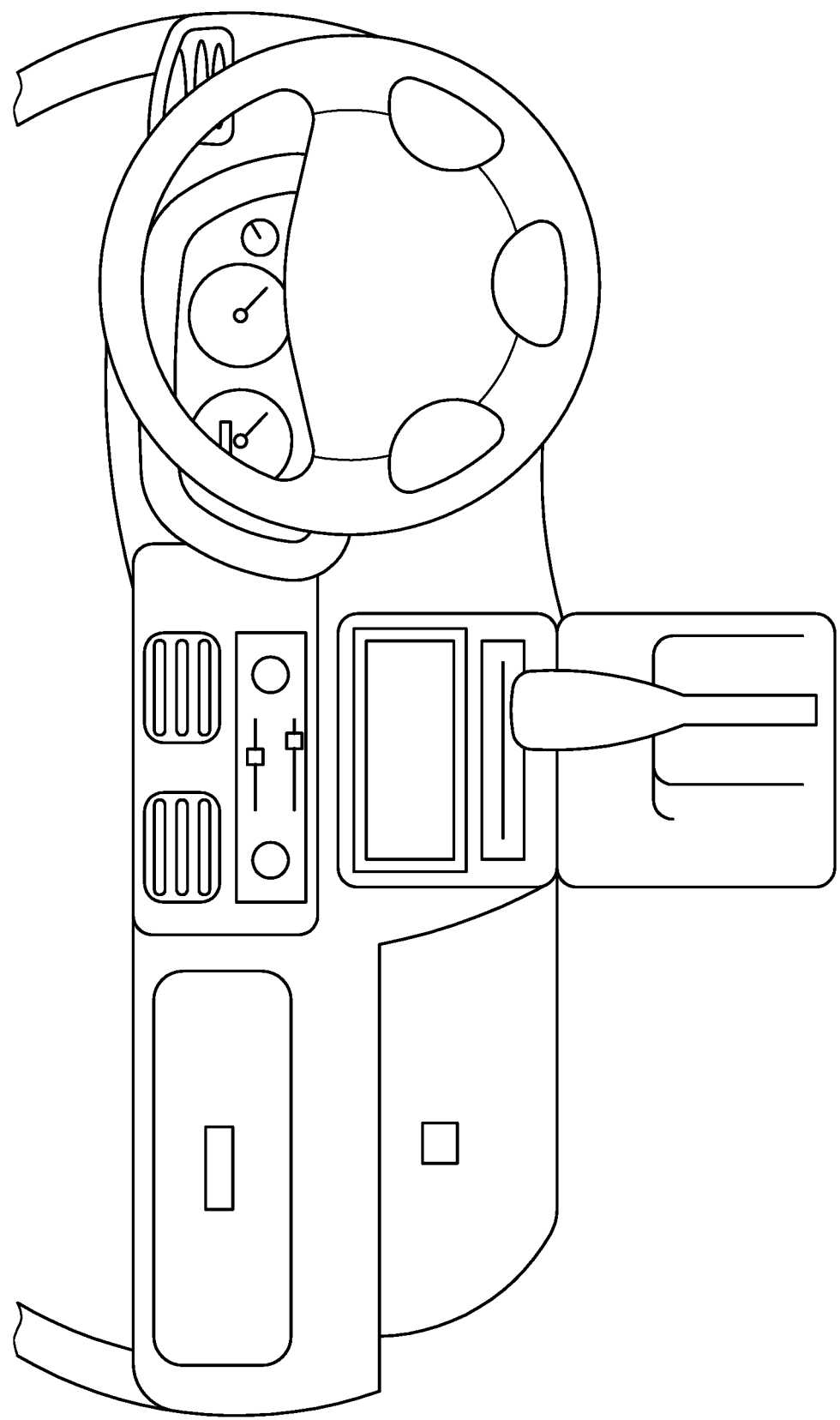

The subject of the present specification is now explained with respect to the following Figures in which FIG. 1 shows a layout of a car infotainment system and of a vehicle electronics, FIG. 2 shows further details of the infotainment system of FIG. 1, FIG. 3 shows a time sequence during a start-up procedure of the infotainment system of FIG. 1, FIG. 4 shows a generation of a compressed splash-screen image for display in the infotainment system of FIG. 1, FIG. 5 shows a message format of messages between a vehicle communication controller and a multimedia controller of the infotainment system of FIG. 1, and FIG. 6 shows a further embodiment of a car infotainment System, FIG. 7 shows a passenger compartment of a car with an infotainment system.

In the following description, details are provided to describe the embodiments of the present specification. It shall be apparent to one skilled in the art, however, that the embodiments may be practised without such details.

FIG. 1 shows a layout of a car's infotainment system 10, which is connected to vehicle electronics 9. The infotainment system 10 comprises a main controller 12 and further components that are not shown in FIG. 1 such as a display, a car radio, a CD player, a digital signal processor (DSP), a hands-free equipment.

The car electronics 9 comprises a vehicle communication controller 11, a CAN bus 13 and further components which are not shown in FIG. 1, such as an engine control unit, a control unit for heating and ventilation, and further electronic components and cable connections. The vehicle communication controller 11 is connected to the CAN bus 13 of a car, which is not shown in FIG. 1.

The vehicle communication controller 11 comprises a UCM unit 14 that provides a unified communication mechanism (UCM), a RM unit 15 that provides a remote messaging interface (RMI), an ICC unit 16 that provides inter CPU communication (ICC), and an SP unit 17 that provides a serial peripheral interface (SPI).

Likewise, the main controller 12 comprises an SP unit 27 for providing a serial peripheral interface, an ICC unit 26 for providing an inter CPU communication and a RM unit 25 that provides a remote messaging interface. Furthermore, the main controller 12 comprise a vehicle sensor driver 18 and an early BL driver 19 for providing back light at an early time.

The SP unit 27, the ICC unit 26, the RM unit 25, the vehicle sensor driver 18 and the early BL driver 19 are located in a kernel space 20 of the main controller 12, or, in other words, they run in a kernel mode. In the kernel mode, a CPU may perform any operation allowed by its architecture; any instruction may be executed, any I/O operation initiated, any area of memory accessed, and so on. In the other CPU modes, certain restrictions on CPU operations are enforced by the hardware. A processor starts up in kernel mode and runs a boot loader in kernel mode. The operating system is loaded and, it too, runs in kernel mode. The processes that it launches usually run in user mode.

The main controller 12 provides a user space 21 for programs that run in a user mode. This applies, for example, to graphics and video display routines and most other processes that run after the operating system has fully booted.

FIG. 1 also shows a data flow 22 from the CAN bus 13 to the vehicle communication controller 11 and from the vehicle communication controller 11 to the main controller 12. The data flow 22 extends from the CAN unit 13 over the UCM unit 14, the RM unit 15, the ICC unit 16 and the SP unit 17 of the vehicle communication controller to the SP unit 27 of the main controller 12 and over the ICC unit 25 and the RM unit 25 of the main controller 12.

Furthermore, a data flow 23 for messages extends from the RM unit 15 of the vehicle communication controller 11 to the RM unit 25 of the main controller 12, a bidirectional data flow 24 extends between the ICC unit 16 of the vehicle communication controller 11 and the ICC unit 26 of the main controller 12. The bidirectional data flow 24 transports data frame messages from the ICC unit 16 of the vehicle communication controller 11 to the ICC unit 26 of the main controller 12, and it transports acknowledgement frames from the ICC unit 26 of the main controller 12 to the ICC unit 16 of the vehicle communication controller 11.

A further bidirectional data flow 30 extends between the vehicle sensor driver 18 and the early business logic driver 19 of the main controller 12.

FIG. 2 shows a further view of a general layout of the infotainment system 10 of FIG. 1.

In the example of FIG. 2, the infotainment system 10 comprises a vehicle communication controller (VCU) 31 and a multimedia controller (MMU) 32. The vehicle communication controller 31 of FIG. 2 corresponds to the vehicle communication controller 11 of FIG. 1 and the multimedia controller 32 of FIG. 2 corresponds to the main controller 12 of FIG. 1.

By way of example, the vehicle communication controller 31 may be provided by a processor of the Texas Instruments product family "TI TMS 470" and the multimedia controller may be provided by a multimedia controller of the product family "i.MX 53" of freescale semiconductors. The multimedia controller 32 comprises a first microcontroller unit (MCU) for handling system functions, CAN communication and other service functions, which is also referred to as "platform" and a second microcontroller unit for handling graphics functions. In other embodiments, the multimedia controller 32 may also comprise several MCUs for handling graphics functions, such as an image processing unit, a video processing unit, a 3D graphics processing unit and a 2D graphics processing unit.

The multimedia controller 32 is connected to peripheral devices 60 such as a DDR RAM, a LDC display, a camera, a CVBS/S video component, a GPS system, or an audio power management system. Furthermore, the multimedia controller 32 is connected to a NOR flash memory 59, which contains a flashable image with an image header. The NOR flash memory may be on the multimedia controller 32, as shown in FIG. 2, or external to it.

The vehicle communication controller 31 comprises a rear view camera (RVC) unit 33, which is connected to a low-speed CAN unit 34, a remote messaging interface unit 35 and a vehicle RB unit 36. The RVC unit 33 provides business logic (BL) for a rear view camera of the car.

The multimedia controller 32 comprises, in a RAM memory, a first kernel mode shared library 37 and a second kernel mode shared library 38. The kernel mode library comprises a splash screen shared library 58. The first shared library 37 comprises a RMI receiver module 39, a touch screen driver 40 and a back light thread 41. The RMI receiver module 39 comprises an input port, which is connected to an output port of a RMI unit 42 of the multimedia controller 32.

Furthermore, the multimedia controller 32 comprises a human machine interface unit 42, a remote message interface unit 43, a CAN driver 44, a platform 45 with a registry handling module 46 and a graphics module 47, a hardware interrupt handling module 48, and a low-voltage differential signalling (LVDS) module 49. The CAN driver 44 is provided for reading and writing CAN signals.

A first data flow of the multimedia controller 32, which is used to activate a display back light, extends from the remote message interface of the multimedia controller 32 via the RMI receiver module 39, the back light thread 41 the touch screen driver to the CAN driver 44.

A second data flow of the multimedia controller 32, which is used to display a splash screen image, extends from the human machine interface 42 over the splash screen shared library of the second kernel mode shared library 38, to the splash screen handling module 46 and the graphics module 47 of the platform 45 and from the graphics module 47 to the hardware interrupt handling module 48 and the LVDS module 49.

The splash screen handling module 46 is provided for reading a splash screen calibration and for saving a currently displayed splash screen. The graphics module 47 is provided for performing a graphic hardware initialization, for retrieving a frame buffer address and for drawing the splash screen image on the display screen.

A shared library or shared object refers to a file that is intended to be shared by executable files and further shared objects files. Modules used by a program are loaded from individual shared objects into memory at load time or run time, rather than being copied by a linker when it creates a single monolithic executable file for the program. In particular, the shared library may be provided by a dynamically linked library, also referred to as a "DLL" in the context of the Microsoft Windows operating system.

FIG. 3 shows a time sequence during a system startup of the infotainment system 10 of FIG. 1. The infotainment system 10 spends a time $\Delta t1$ for a CAN bus wake-up, a time $\Delta t2$ for a turning on of the second processor 32, and a time $\Delta t3$ for booting the operating system. From the time the operating system is started, the infotainment system spends a time $\Delta t4$ until a RMI unit 15, 25 receives a first message, a time $\Delta t5$ until a backlight is activated, and a time $\Delta t6$ until a graphic handling library is loaded. In the Windows Embedded operating systems, this is the graphics, windowing and event subsystem library "gwes.dll". An additional time $\Delta t7$ is needed to load a video handler.

According to a first aspect of the present specification, a background image is displayed already after the backlight is activated at the time $\Delta t1+\Delta t2+\Delta t5$ without the need to load a graphic library or a video handler first, which would require the time $\Delta t1+\Delta t2+\Delta t6$ or even $\Delta t1+\Delta t2+\Delta t6+\Delta t7$. Instead of drawing the logo on the screen using an HMI module and a graphics library, a standalone solution is provided, which is independent from the normal drawing.

According to a second aspect of the resent specification, which is explained below with respect to FIG. 4, one or more background images are converted to flashable image files and are stored in a computer memory, in particular in a flash memory.

According to a third aspect of the present specification, a back light is turned on early such that a splash screen image can be displayed early.

FIG. 4 shows a method of creating flashable image files for a display in the infotainment system of FIG. 1.

In a first step 51, an image 50, 50' is encoded and a data header is added to the encoded image data and a runtime encoded file is created. In a step 52, the run-time encoded files are combined and flashable image files are created. In a step 53, the flashable image files are saved in a computer readable memory, in particular in a flash memory.

According to the present specification, an image size of the flashable image is kept small. The image size affects the amount of storage required and the time required to load these images from the memory device to the RAM. Among others, the size of the required memory depends on the color gradient being used. The image size could be in the order of MB.

In step 51, the uncompressed image files are compressed into run-length encoded files (having the filename extension ".sec") and, an image header with ID and size information is appended to the beginning of the image file. Alternatively or in addition, other encoding methods can be used. The runlength encoding provides a compromise between effective compression and speed of decoding and is particularly effective when there are large contiguous regions in the same colour, as is the case for a logo on a unicolor background.

In the step 52, all run-length encoded files are combined and flashable image files are created (having the filename extensions ".fli" and ".ppi").

In the step 53, the flashable image files are saved or "flashed" into a computer readable storage. The computer readable storage is characterized in that it allows a fast access. In one embodiment, it is provided by a flash memory, for example by a NOR flash memory. In another embodiment it is provided by NAND flash memory. A flash memory is a type of EEPROM that can be written in large blocks, thereby requiring less erase cycle than standard EEPROM. Other types of nonvolatile, solid state storage may be used as well.

According to the first aspect of the present specification, the image is then displayed using one or more customized software component. In particular, the customized software components comprise the kernel mode shared library 38 shown in FIG. 2.

The customized software component copies the image data into the display frame buffer rather than creating the drawing with standard graphics routines. A kernel mode driver, such as the splash screen shared library 58, is loaded in kernel model. Thereby, it can be loaded early in the boot phase of an operating system, for example it can be loaded in the boot phase 1 of Windows Embedded Automotive 7 (WEA7).

In particular, the boot phases of Windows compact edition 7 are characterized by the following features. Windows compact edition 7 goes through two boot phases during startup. During the first boot phase, the system loads the kernel with minimum drivers to access the device's file system and to access registry data. After the registry data is read, the system continues with the second boot phase to load the remaining components based on registry configuration data.

The kernel mode driver comprises an initialization routine, also referred to as "driver Init( )" function, which performs the following tasks:

Reading from configuration data a type of splash screen to be shown, based on a calibration method, Opening and Reading the Header of the flashable image (".fli") file, Retrieving the address of a frame buffer in which the image buffer is to be copied, Reading out the header to find a required buffer size and copy the image data into a buffer in a routine "readfile", Decoding the run-length encoded image, or, in other words, the SCC file, to raw data, Copying the splash screen image data buffer into the display memory using the address of the frame buffer, and Flipping the frame buffer to make the splash screen visible.

Within the context of the present specification, a frame buffer is a large, contiguous piece of computer memory. The frame buffer stores the display data, also referred to as "raw data". In the raw data, there is at least one memory bit for each pixel.

The flipping of the frame buffer is used to copy the raw data from a working buffer to a display buffer in a display that works on a double buffering concept. The double buffering concept can be used to display a screen image more rapidly. For example, a work memory and a display memory may store image data of frames adjacent in terms of time. If the frames have similar image data, a direct memory access controller can be used to fast block-copy the same portion of image data of a current screen, or image data stored in the work buffer to the display buffer in a hardware manner.

The physical address of the frame buffer can be found using an operating system library, such as the board support package (BSP) of WEA7. In this case, the physical address may be found using an image_cfg.h file or in a config.bib file, which provides setting for memory mapping.

By way of example, the "MmMapIoSpace" operating system function of WEA7 can be used to map this physical address to a virtual address, as shown in the following C-program snippet, wherein the physical address of the frame buffer is referred to as "PHYSICAL_ADD_FBUFF" and the virtual address is assigned to the memory pointer "ptr":

```
PHYSICAL_ADDRRESS lpa;
lpa.QuadPart = PHYSICAL_ADD_FBUFF;
void *ptr;
if (ptr= (UCHAR* MmMapIoSpace (lpa, FBUFF_SIZE, FALSE)) == NULL
{
  return FALSE;
}
```

The function call to "MmMapIoSpace" is required because a direct memory access to physical area is not allowed in a Windows CE operating system. Instead, the physical address space needs to be mapped to the virtual address space, which the operating system assigns to a given process, to control the hardware.

According to the third aspect of the present specification the LCD back is turned on early during a start-up procedure of the infotainment system 10. In order to allow a multimedia controller (MMU) to decide when to turn on the back light, a power state, which is handled by the vehicle communication controller (VUC), is passed to the multimedia controller.

According to the present specification, a remote messaging (RMI) protocol is used to achieve an early transfer of the power state to the MMU from the VUC.

Specifically, a customized kernel mode driver is loaded in a kernel mode, which is active in the boot phase 1 of WEA7.

The driver performs the following functions:

Spawning a thread in driver Init ( ) function, which will be waiting for an RMI Event.

Sending a CAN signal to a high-speed CAN to enable the display module (DGT) and to turn on the back light.

These functions are performed, among others, by the RMI receiver 39, back light thread 41 and the touch screen driver 40 of the kernel mode shared library 37 and by the CAN driver 44 shown in FIG. 2.

Normally, the communication between the vehicle communication controller 31 and the multimedia controller 32 of FIG. 2 is carried out using a bidirectional communication protocol such as the MOST protocol, which requires some handshaking synchronization before starting the bidirectional communication.

Furthermore, the required MOST software modules are big and require some time to load during boot up.

By contrast, according to the present specification the required information to show a splash screen logo, which is an event to turn on back light, is transferred from the vehicle communication controller 31 to the multimedia controller 32. The triggering of the event to turn on the back light is dependent on a power module, which is also executed by the vehicle communication controller.

Therefore, the event to turn on the back light can be triggered without the need of a two-way communication between the vehicle communication controller and the multimedia controller. According to the present specification, a customized tiny one-way transmission protocol is used, which is implemented by the components 35, 43 and 39 shown in FIG. 2.

In the context of the present specification, this protocol is referred to as remote messaging interface (RMI) protocol.

FIG. 5 shows a message format of a remote messaging interface protocol. The Remote Messaging Interface (RMI) protocol in is used by the vehicle communication controller (TI) side to transfer critical data such as Vehicle Speed, Wheel Pulse, Gear Signal, Fmux eject, etc. via the CAN bus to multimedia controller 32 in a periodic manner. The RMI message format is built on top of the interchip communication (ICC) message format. The communication between the two controllers 31, 32 is always unidirectional whereby the vehicle communication controller 31 will always act as transmitter. The RMI protocol runs in parallel with the MOST protocol.

According to a first RMI message format, which is shown in the topmost and in the third row of FIG. 5, a message comprises a tag with a fixed length of length 1 byte, a length specifier with a fixed length of length 1 byte and a payload segment of n-bytes, the number n of bytes being specified in the length specifier.

According to a second message format, the message comprises only a tag and a fixed length value, according to a third format, the message comprises only a tag. Thus, the length and value fields are optional. The messages according to the first format can also be appended or concatenated to each other, as shown in the bottom position of FIG. 5.

Likewise, messages according to the first, second or third message format can be concatenated.

Furthermore, the messages can be packaged according to a higher level communication protocol, as shown in the second row of FIG. 5. Preferentially, the higher level communication protocol is a bus protocol for transmitting data in a car, such as the CAN bus protocol.

According to a further embodiment, an image to be displayed is not read out from a flash memory but from a rear view camera of the car. Similar to the previous embodiment, a customized kernel mode shared library writes the display information into a graphics memory of the display, which causes the image of the rear view camera to be displayed. If the display device works on a dual buffer principle, a further step of flipping the content of a work memory with the content of a display memory causes the image to be displayed.

FIG. 6 shows a further embodiment, in which is similar to the embodiment of FIG. 2, but in which the kernel mode shared library comprises a video driver shared library. A rear view camera 61 is connected to the multimedia controller 32. During a boot phase of the operating system, the video driver shared library receives video images from the rear view camera and displays the video images by writing them into a graphics buffer of a display device of the multimedia controller 32.

The embodiments can also be described with the following lists of features or elements being organized into an item list. The respective combinations of features, which are disclosed in the item list, are regarded as independent subject matter, respectively, that can also be combined with other features of the application.

1. An infotainment assembly for a vehicle, comprising
    a vehicle communication controller, the vehicle communication controller comprising
        a bus connection for connecting a serial bus of the vehicle,
        a message processing unit,
        a remote messaging interface for sending out messages using a one-way protocol,
    a multimedia controller that is connected to the vehicle communication controller via an interchip communication bus, the multimedia controller comprising
        a display connection for connecting a display device of the vehicle,
        a message receiver for receiving messages according to the one-way protocol,
        a computer readable memory with an operating system, the operating system providing multiple boot phases for the multimedia controller, wherein graphics drivers of the operating system for controlling the display device are loaded in a later boot phase of the operating system,
        a message handler unit for activating a back light of the display device in response to a power state message received from the message receiver, the power state message indicating a powered on state of a vehicle electronics, the message handler unit being operative during an earlier boot phase of the operating system, the earlier boot phase preceding the later boot phase.
2. The infotainment assembly according to item 1, wherein the vehicle communication controller comprises a message dispatcher unit, the message dispatcher unit being operative to send messages according to the one-way protocol.
3. The infotainment assembly according to item 2, wherein the one-way protocol is implemented on top of an interchip communication protocol.
4. The infotainment assembly according to item 3, wherein the interchip communication protocol is a protocol of a communication bus of the vehicle electronics.
5. The infotainment assembly according to item 4, wherein the communication bus is a low speed CAN bus.
6. An infotainment assembly for a vehicle, comprising
    a vehicle communication controller, the vehicle communication controller comprising
        a bus connection for connecting a serial bus of the vehicle,
        a message processing unit,
        a remote messaging interface for sending out messages using a one-way protocol,
    a multimedia controller that is connected to the vehicle communication controller via an interchip communication bus, the multimedia controller comprising
        a display connection for connecting a display device of the vehicle,
        a message receiver for receiving messages according to the one-way protocol,
        a computer readable memory with an operating system, the operating system providing multiple boot phases for the multimedia controller, wherein graphics drivers of the operating system for controlling the display device are loaded in a later boot phase of the operating system,
        a graphics driver for retrieving a image from a computer readable memory or from a video input, for decoding the image into a raw image and for transmitting the raw image, the graphics driver being operative during an earlier boot phase of the operating system, the earlier boot phase preceding the later boot phase.
7. The infotainment assembly according to item 6, wherein the multimedia controller comprises a flash memory, the flash memory comprising a compressed image, the graphics driver comprising an instruction set for deriving a raw image from the compressed image.
8. The infotainment assembly according to item 7, wherein the compressed image is a run length encoded image.
9. The infotainment assembly according to any of the items 2 to 4, comprising a display buffer, wherein the graphics driver causes the raw image to be copied into the display buffer.
10. The infotainment assembly according to any of the items 6 to 9, comprising a work buffer and a display buffer, the, the graphics driver being operative to copy the raw image into the work buffer.
11. The infotainment assembly according to any of the items 6 to 10, wherein
    the graphics driver is operative to receive a signal indicating that a back light of the display device is turned on and to retrieve the image in response to the signal indicating that the back light of the display is turned on.
12. A car infotainment system with the infotainment assembly according to any of the preceding items, wherein
    the car infotainment system comprises a display device with a display screen, the display device being connected to a video output of the infotainment assembly.
13. A car with the car infotainment system according to item 12, comprising
    a vehicle electronics bus being connected to an input of the car infotainment assembly.

14. A method for activating a display of a car infotainment system, comprising
detecting a power state of the car electronics,
transmitting information about the power state from a vehicle communication controller to a multimedia controller using a one-way communication protocol,
receiving the power state signal, and
sending a back light command signal to the display to turn on a back light of the display on if the power state indicates a powered on state,
wherein the steps of the method are executed during an earlier boot phase of an operating system providing multiple boot phases, wherein the earlier boot phase preceding a later boot phase in which graphics drivers of the operating system are loaded.

15. A method for displaying a screen image on a display of a car infotainment system, comprising
retrieving an image from a computer readable memory,
decoding the compressed image into a raw image,
loading the raw image into a display buffer of the car infotainment system, and
displaying the content of the display buffer on the display, wherein the steps of the method are executed during an earlier boot phase of an operating system providing multiple boot phases, wherein the earlier boot phase preceding a later boot phase in which graphics drivers of the operating system are loaded.

REFERENCE LIST 9 vehicle electronics
10 infotainment system
11 vehicle communication controller
12 main controller
13 CAN bus
14 UCM unit
15 RM unit
16 ICC unit
17 SP unit
18 vehicle sensor driver
19 early BL driver
20 kernel space
22 data flow
23 data flow
24 bidirectional data flow
25 RM unit
26 ICC unit
27 SP unit
30 bidirectional data flow
31 vehicle communication controller
32 multimedia controller
33 rear view camera unit
34 low speed CAN unit
35 RMI unit
36 vehicle RB unit
37 kernel mode shared library
38 kernel mode shared library
39 RMI receiver module
40 touch screen driver
41 back light thread
42 RMI unit
43 RMI unit
44 CAN driver
45 platform
46 registry handling module
47 graphics module
48 hardware interrupt handling module
49 low voltage differential signalling module
50 image
51 step
52 combining step
53 saving step
58 splash screen shared library
59 NOR flash memory
60 peripheral devices
60' peripheral devices
61 rear view camera

The invention claimed is:

1. An infotainment assembly for a vehicle, comprising
a vehicle communication controller, the vehicle communication controller comprising
a bus connection for connecting a serial bus of the vehicle,
a message processing unit,
a remote messaging interface for sending out messages using a one-way protocol,
a multimedia controller that is connected to the vehicle communication controller via an interchip communication bus, the multimedia controller comprising
a display connection for connecting a display device of the vehicle,
a message receiver for receiving messages according to the one-way protocol,
a computer readable memory with an operating system, the operating system having multiple boot phases for the multimedia controller, wherein during an earlier boot phase of the operating system, a kernel space of the operating system is loaded with drivers to access a file system of the multimedia controller and to access registry data of the operating system, and, wherein during a later boot phase of the operating system, after reading the registry data, a plurality of remaining components are loaded based on registry-configuration data, wherein graphics drivers of the operating system for controlling the display device are loaded in the later boot phase of the operating system, and
a message handler unit for activating a back light of the display device in response to a power state message received from the message receiver, the power state message indicating a powered on state of a vehicle electronics, the message handler unit being operative during the earlier boot phase of the operating system, the earlier boot phase preceding the later boot phase.

2. The infotainment assembly according to claim 1, wherein the vehicle communication controller comprises a message dispatcher unit, the message dispatcher unit being operative to send messages according to the one-way protocol.

3. The infotainment assembly according to claim 2, wherein the one-way protocol is implemented on top of an inter-chip communication protocol.

4. The infotainment assembly according to claim 3, wherein the interchip communication protocol is a protocol of a communication bus of the vehicle electronics.

5. The infotainment assembly according to claim 4, wherein the communication bus is a low speed CAN bus.

6. The infotainment assembly according to claim 2, comprising a display buffer, wherein the graphics driver causes a raw image to be copied into the display buffer.

7. The infotainment assembly according to claim 1, wherein the display device includes a display screen, the display device being connected to a video output of the infotainment assembly.

8. The infotainment assembly according to claim 7, further comprising a vehicle electronics bus being connected to an input of the infotainment assembly.

9. A method for activating a display of a car infotainment system, comprising
- detecting a power state of the car electronics,
- transmitting information about the power state from a vehicle communication controller to a multimedia controller using a one-way communication protocol,
- receiving the power state signal, and
- sending a back light command signal to the display to turn on a back light of the display on if the power state indicates a powered on state, wherein the steps of the method are executed during an earlier boot phase of an operating system having multiple boot phases, wherein during an earlier boot phase of the operating system, a kernel space of the operating system is loaded with drivers to access a file system of the multimedia controller and to access registry data of the operating system, and, wherein during a later boot phase of the operating system, after reading the registry data, a plurality of remaining components are loaded based on registry configuration data, wherein the earlier boot phase precedes the later boot phase in which graphics drivers of the operating system are loaded.

* * * * *